(12) United States Patent
Kumar et al.

(10) Patent No.: US 8,353,800 B2
(45) Date of Patent: Jan. 15, 2013

(54) LIMITED SLIP DIFFERENTIAL USING FACE GEARS AND A PINION HOUSING

(75) Inventors: Sandeep Kumar, Maharashtra (IN); Steven J. Cochren, Commerce, MI (US); Stephen P. Radzevich, Sterling Heights, MI (US); Paul N. Herrmann, Clinton Township, MI (US); Steven A. Rudko, Eastpointe, MI (US)

(73) Assignee: Eaton Corporation, Cleveland ( * ) Notice: Subject to any disclaimer, the term of this patent is extended or adjusted under 35 U.S.C. 154(b) by 329 days.

(21) Appl. No.: 12/760,988

(22) Filed: Apr. 15, 2010

(65) Prior Publication Data

US 2010/0317482 A1      Dec. 16, 2010

Related U.S. Application Data

(60) Provisional application No. 61/186,618, filed on Jun. 12, 2009.

(51) Int. Cl.
*F16H 48/06* (2006.01)

(52) U.S. Cl. ........................................ 475/226

(58) Field of Classification Search ............... 475/226, 475/223
See application file for complete search history.

(56) References Cited

U.S. PATENT DOCUMENTS

| | | | |
|---|---|---|---|
| 1,487,073 A * | 3/1924 | Nogrady | 475/160 |
| 1,988,183 A * | 1/1935 | Whitcomb | 475/226 |
| 3,237,483 A | 3/1966 | Kelley et al. | |
| 3,706,239 A | 12/1972 | Myers | |
| 4,248,105 A | 2/1981 | Downing et al. | |
| 4,791,832 A * | 12/1988 | McCaw | 475/226 |
| 5,030,185 A | 7/1991 | Kawamura | |
| 5,232,415 A * | 8/1993 | Brewer et al. | 475/227 |
| 5,472,385 A | 12/1995 | Vu | |
| 5,984,823 A | 11/1999 | Gage | |
| 6,592,487 B2 * | 7/2003 | Gassmann | 475/223 |
| 6,599,217 B2 | 7/2003 | Caringella et al. | |
| 2009/0019966 A1 | 1/2009 | Valente | |

FOREIGN PATENT DOCUMENTS

DE     102006046096 A1     4/2008

OTHER PUBLICATIONS

European Patent Office, International Search Report and Written Opinion in counterpart PCT Application No. PCT/US2010/038183. Date of Mailing: Jul. 26, 2010.
Litvin et al., Face Gear Drive with Helical Involute Pinion: Geometry, Generation by a Shaper and a Worm, Avoidance of Singularities and Stress Analysis, Feb. 2005, 62 pgs.

* cited by examiner

*Primary Examiner* — Justin Holmes
*Assistant Examiner* — Stacey Fluhart
(74) *Attorney, Agent, or Firm* — Dykema Gossett PLLC

(57) ABSTRACT

A differential includes a differential case; a side gear comprising a helical face gear; a helical pinion configured for meshing engagement with the side gear; and a pinion housing configured to support the helical pinion. The pinion housing includes a first face; a second face opposing the first face; a first projection located on the first face; and a second projection located on the second face. In some embodiments, the differential further comprises an actuator configured for engagement with the pinion housing and a plurality of friction plates disposed between the actuator and the differential case. The pinion housing also includes an aperture or hole extending radially inwardly from an outer radial surface of the generally annular ring; and a channel extending from the first face to the second face, wherein the channel is substantially radially aligned with the aperture or hole.

19 Claims, 3 Drawing Sheets

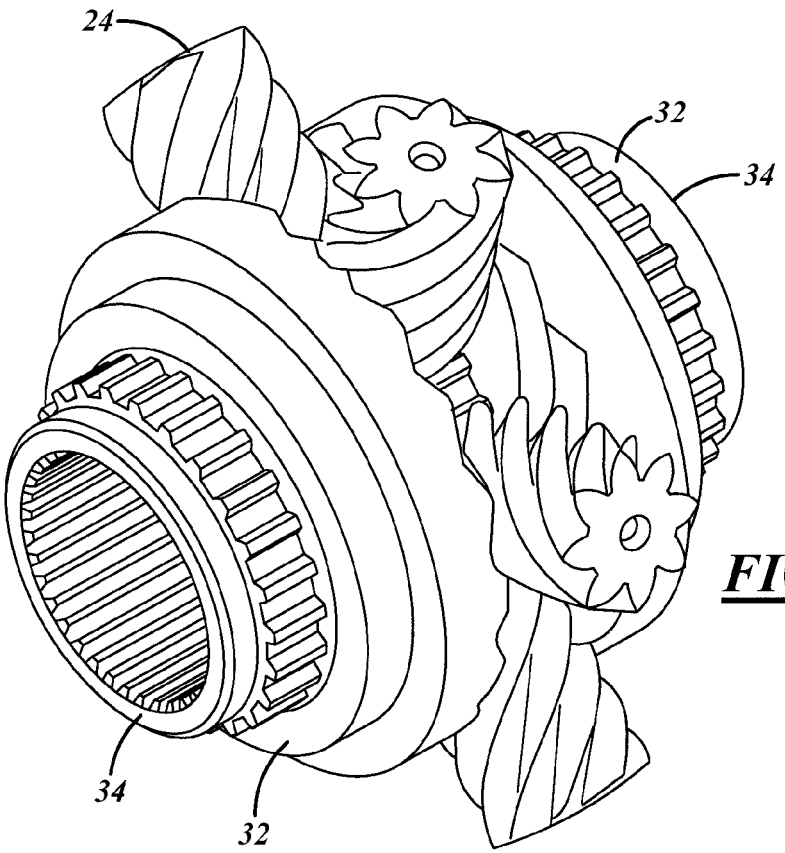
FIG. 4
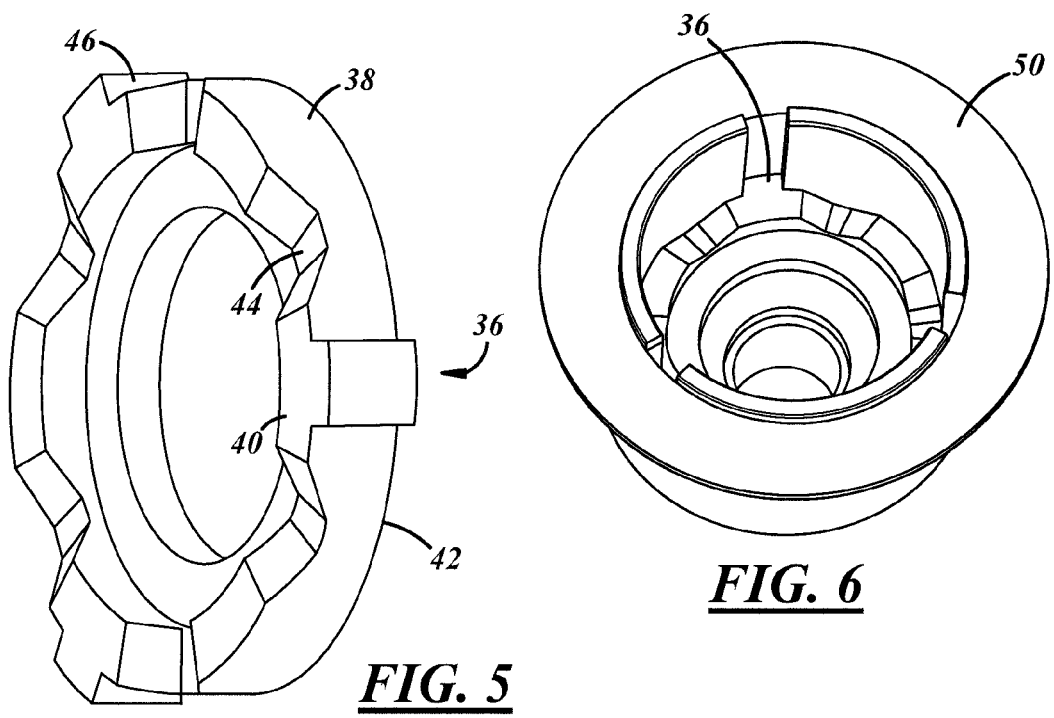
FIG. 5
FIG. 6

US 8,353,800 B2

LIMITED SLIP DIFFERENTIAL USING FACE GEARS AND A PINION HOUSING

CROSS REFERENCE TO RELATED APPLICATIONS

This application claims the benefit of U.S. provisional application No. 61/186,618, filed 12 Jun. 2009, which is hereby incorporated by reference as though fully set forth herein.

TECHNICAL FIELD

The present invention relates to a housing configured to support pinions in a differential, and includes a differential incorporating a housing that is configured to support pinions.

BACKGROUND

Helical face gears for use in differentials are known in the art, as set forth for example, in U.S. Pat. Nos. 3,253,483 and 4,791,832. However, the incorporation of helical face gears into differentials has not been commonly utilized because of, for example, challenges with respect to the strength of the gears, which may adversely affect performance of the gear set in the differential and/or limit the torque application.

SUMMARY

A differential comprises a differential case; a side gear comprising a helical face gear; a helical pinion configured for operative or meshing engagement with the side gear; and a pinion housing. The pinion housing is configured to support the helical pinion and includes: a first face; a second face opposing the first face; a first projection located on the first face; and a second projection located on the second face. In accordance with some embodiments, the differential further comprises an actuator configured for engagement with the pinion housing. The actuator comprises a first face that includes a depression substantially corresponding in shape to the first projection or the second projection on the pinion housing. In accordance with some embodiments, the differential further comprises a plurality of friction plates disposed between the actuator and the differential case.

A housing is configured to support at least one helical pinion in a differential and comprises a generally annular ring. The generally annular ring has a first face and a first projection located on the first face and extending in the axial direction of the generally annular ring. The generally annular ring also has a second face and a second projection located on the second face and extending in the axial direction of the generally annular ring. The generally annular ring also has an aperture or hole extending radially inwardly from an outer radial surface of the generally annular ring. The generally annular ring also has a channel extending from the first face to the second face, wherein the channel is substantially radially aligned with the aperture or the hole.

BRIEF DESCRIPTION OF THE DRAWINGS

Embodiments of the invention will now be described, by way of example, with reference to the accompanying drawings, wherein:

FIG. 4 is a perspective view of a pinion and a side gear of the differential of FIG. 1.

FIG. 5 is a perspective view of an actuator of the differential of FIG. 1.

FIG. 6 is a perspective view of the actuator of FIG. 5 disposed in a differential case of the differential of FIG. 1.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
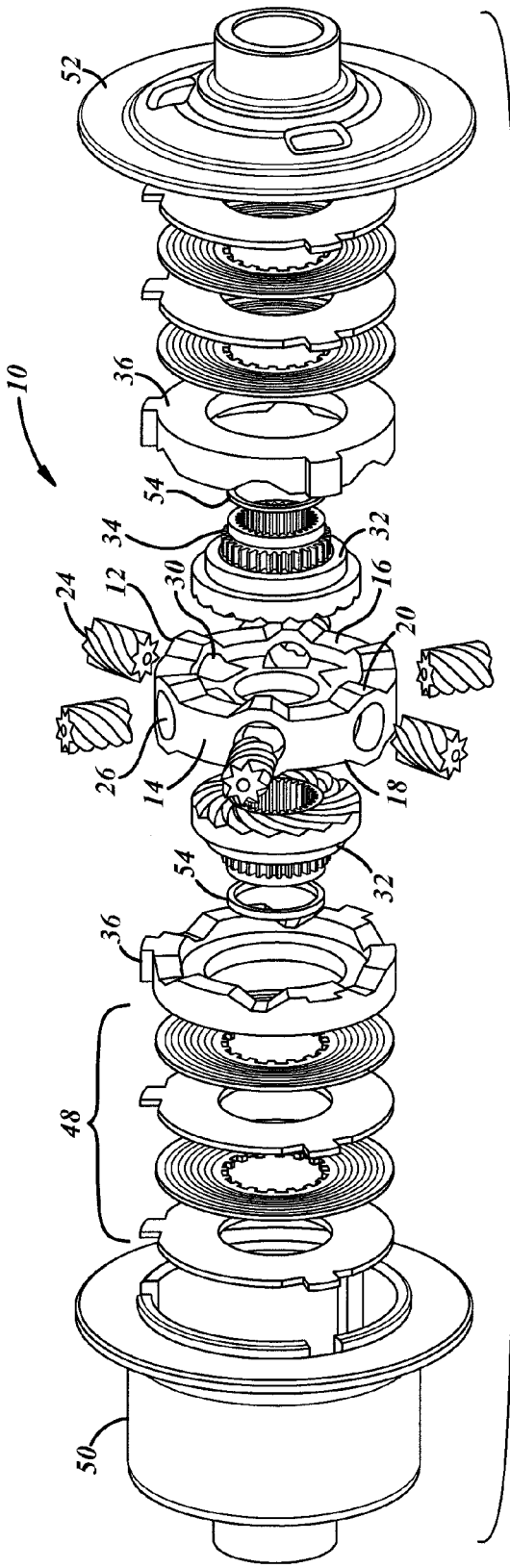
FIG. 1 is an exploded perspective view of a differential in accordance with an embodiment of the invention.
Figure 2:
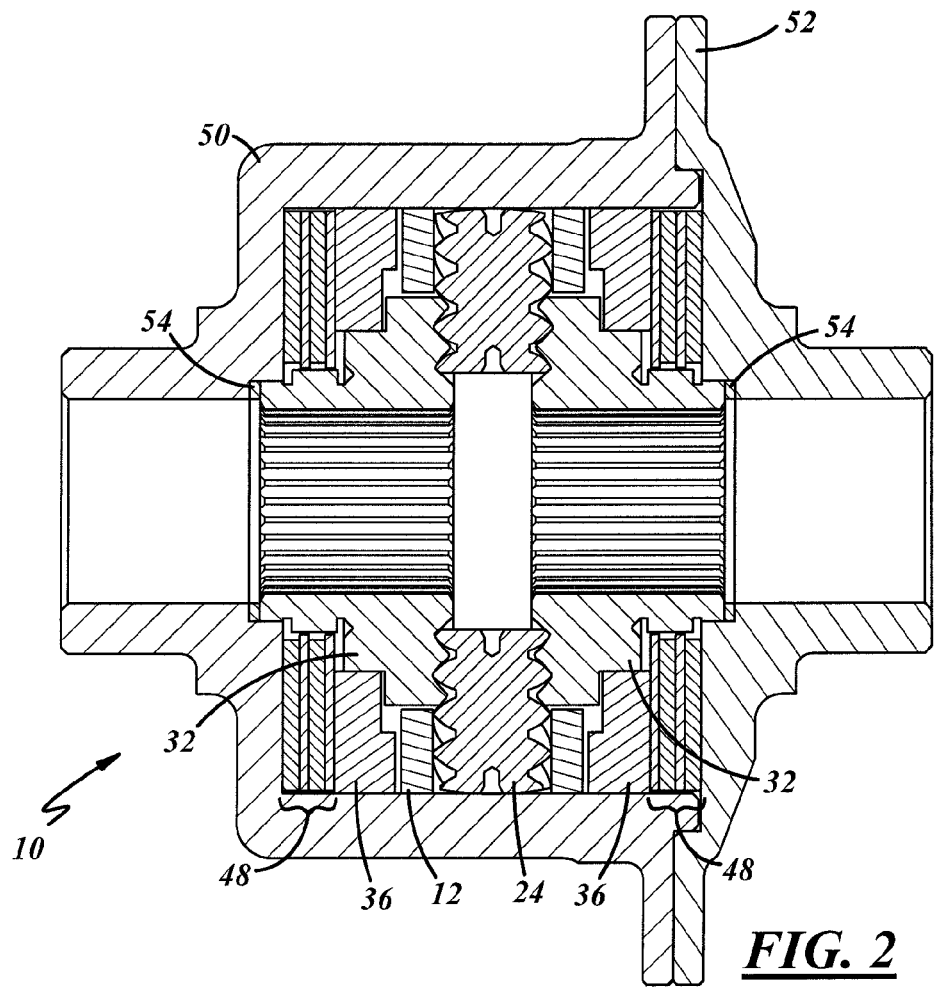
FIG. 2 is a cross-sectional view of a differential in accordance with an embodiment of the invention.
Figure 3:
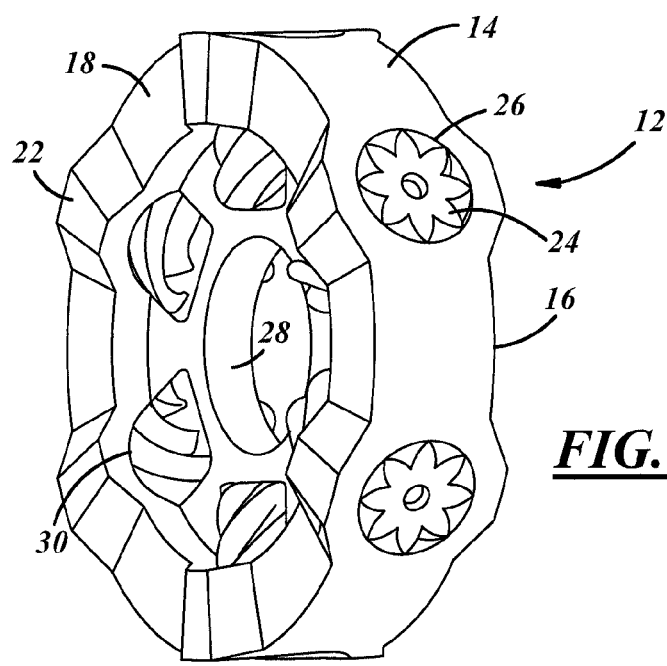
FIG. 3 is a perspective view of a pinion housing of the differential of FIG. 1.

FIGS. 1-2 generally illustrate an embodiment of differential 10 shown in accordance with teachings of the present invention. Differential 10 may comprise a pinion housing 12. Referring now to FIGS. 1 and 3, pinion housing 12 may be made from one piece of material (e.g., comprise a unitary, integral, and/or monolithic structure) in accordance with an embodiment of the invention. Pinion housing 12 may be generally ring-shaped in accordance with an embodiment of the invention. Pinion housing 12 may comprise an outer radial surface 14 that extends circumferentially around the pinion housing 12. Pinion housing 12 may further comprise a first face 16 and a second face 18. The second face 18 may oppose the first face 16.

The pinion housing 12 may include a first projection 20 located on the first face 16. The first projection 20 may extend in the axial direction of the generally annular ring comprising the pinion housing 12. The pinion housing 12 may further include a second projection 22 located on the second face 18. The second projection 22 may extend in the axial direction of the generally annular ring comprising the pinion housing 12. The pinion housing 12 may include a single projection 20 on the first face 16, and a single projection 22 on the second face 18 in an embodiment of the invention. The pinion housing 12 may include a plurality of projections 20 on the first face 16 and/or a plurality of projections 22 on the second face 18 in accordance with some embodiments of the invention. At least one of the first projections 20 may comprise a ramp or a wedge in accordance with an embodiment of the invention. Each of the first projections 20 may comprise a ramp or a wedge in accordance with an embodiment of the invention. At least one of the second projections 22 may comprise a ramp or a wedge in accordance with an embodiment of the invention. Each of the second projections 22 may comprise a ramp or a wedge in accordance with an embodiment of the invention.

At least one of the first projections 20 may comprise a plurality of surfaces in accordance with an embodiment of the invention. For example and without limitation, at least one of the surfaces may be substantially parallel to the first face 16, and at least one of the surfaces may be substantially angled relative to the first face 16. At least one of the second projections 22 may comprise a plurality of surfaces in accordance with an embodiment of the invention. For example and without limitation, at least one of the surfaces may be substantially parallel to the second face 18, and at least one of the surfaces may be substantially angled relative to the second face 18. In accordance with an embodiment of the invention, at least one of the first projections 20 and/or second projections 22 may comprise about three surfaces. Although a ramp or wedge comprising three surfaces is mentioned in detail and generally illustrated, the first and second projections 20, 22 may comprise fewer or more surfaces in accordance with various embodiments of the invention.

Pinion housing 12 may be configured for locating and/or supporting one or more pinions 24. The pinions 24 may be disposed in a radial pattern or the pinions 24 may be circumferentially spaced around the circumference of the pinion housing 12. The pinion housing 12 may have a plurality of radially inwardly extending apertures or holes 26. The apertures 26 may extend radially inwardly into the pinion housing 12 from the outer radial surface 14 of the pinion housing 12. The apertures 26 may each have an axis that extends substantially radially outwardly from the approximate center of the pinion housing 12. At least one of the first projections 20 of the pinion housing 12 may be located proximate aperture 26. At least one of the second projections 22 of the pinion housing 12 may be located proximate aperture 26. For example only, and without limitation, there may be approximately six apertures 26 extending through the pinion housing 12. Although six apertures 26 are mentioned in detail, there may be fewer or more apertures 26 in other embodiments of the invention. The apertures 26 may be equi-angularly spaced around the circumference of the pinion housing 12. Although the apertures 26 are described as being equi-angularly spaced around the circumference of the pinion housing 12, the apertures 26 may be spaced in any alternate arrangements and/or configurations in other embodiments of the invention.

The pinion housing 12 may further comprise an inner radial surface 28. The pinion housing 12, including the inner radial surface 28 may be configured to restrain the pinions 24 from axial movement. The inner radial surface 28 may extend circumferentially around the pinion housing 12, such that each of apertures 26 may comprise a blind aperture. For example, a first end of the aperture 26 at the outer radial surface 14 may be open, while a second end of the aperture 26 at the inner radial surface 28 may be closed. The second end of the aperture 26 may oppose the first end of the aperture 26. The pinion housing 12 may further include a channel 30 extending from the first face 16 to the second face 18 of the generally annular ring of the pinion housing 12. The channel 30 may be substantially aligned with the apertures 26 (e.g., substantially radially aligned with the apertures 26). Further, the number of channels 30 may generally correspond to the number of apertures 26 in the pinion housing 12, although fewer or more channels 30 than the number of apertures 26 may be used in embodiments of the invention. The pinion housing 12 may be configured to support the pinions 24 to be in operative or meshing engagement with side gears 32. The pinion housing 12 has been removed in FIG. 4 for illustrative purposes, and FIG. 4 generally illustrates the operative or meshing engagement between pinions 24 and side gears 32. As generally described and illustrated, the pinion housing 24 may exert pressure on the pinions 24 to move them around and/or about an axial center line of the side gears 32.

Still referring to FIGS. 1-3, the differential 10 may comprise the pinions 24. Pinion 24 may comprise a helical pinion. Accordingly, pinion 24 may include a number of helical teeth. The number of helical teeth and the geometry of the tooth flank of the helical teeth may vary in accordance with various embodiments of the invention. The helical pinion 24 may be generally cylindrical in accordance with an embodiment of the invention, although the shape of the helical pinion may vary in accordance with various embodiments of the invention. There may be a plurality of pinions 24 in some embodiments of the invention. The number of the pinions 24 in the differential 10 may vary. However, there may generally be at least two pinions 24. The number of pinions 24 may be about six in an embodiment, although greater or fewer pinions 24 may be used in other embodiments. The number of pinions 24 may generally correspond to the number of apertures 26 in the pinion housing 12, although fewer pinions 24 in relation to the number of apertures 26 may be used in embodiments of the invention. In these embodiments of the invention, at least one or more of the apertures 26 may remain open. The size of pinions 24 may also vary, but may generally be sized so as to fit operatively within the apertures 26 of the torque ring so as to allow the pinions 24 to be free to rotate within apertures 26. The pinions 24 may generally be axially trapped between the inner radial surface 28 of the pinion housing 12 and an inner surface of a differential case (or other housing for the pinion housing 12).

Referring now to FIGS. 1-2 and 4, the differential 10 may further comprise the side gears 32. Side gears 32 may have a helical face (i.e., comprise helical face gears). Accordingly, side gears 32 may include a number of helical teeth. The number of helical teeth and the geometry of the tooth flank of the helical teeth may vary in accordance with various embodiments of the invention. The use of forging technology in place of machine-cutting technology for the side gears 32 may significantly improve the strength of side gears 32. Accordingly, helical face gears comprising the side gears 32 may be robust and well-supported. The use of high strength helical face gears may allow for higher torque application and provide a wider range of torque bias ratio. In addition, the compact size of side gears 32 comprising helical face gears in connection with a pinion housing 12 may allow for greater flexibility in packaging and design, thereby increasing the transportability of a differential that includes the side gears 32. In particular, helical face technology may allow for the use of the side gears 32 in connection with various packaging designs of various models of motor vehicles. The compact size of side gears 32 comprising helical face gears in connection with a pinion housing 12 may also allow for the direction of dynamic forces in a more beneficial way.

The helical face of each side gear 32 may face pinion housing 12. The side gears 32 may be configured to be in operative or meshing engagement with the pinions 24. In particular, the helical teeth of the side gears 32 may be in an operative, or meshing, engagement with the helical teeth of the pinions 24. Both the helical teeth of the side gears 32 and the helical teeth of the pinions 24 may extend into channels 30 in the pinion housing 12. With a configured meshing engagement between the pinions 24 and the side gears 32, the side gears 32 may be forced to turn about their axis. The side gears 32 may be configured to transmit torque from the pinions 24 to an output (e.g., axle shafts of a motor vehicle). Because the output (e.g., axles shafts) are grounded and coupled to the side gears 32, a motor vehicle incorporating the differential 10 may move. When the side gears 32 rotate at different speeds by grounding through the output (e.g., axle shafts), the pinions 24 may rotate within the pinion housing 12 and in mesh with the side gears 32 to compensate. A first and second side gear 32 may be disposed on opposing sides of the pinion housing 12. Each side gear 32 may have a first annular hub portion 34 that is configured to receive an axle shaft (not shown) of a motor vehicle, for example. An inner radial surface of the first annular hub portion 34 of the side gear 32 that may include a plurality of splines. The axle shafts may connect to side gears 32 through a splined interconnection with the splines.

Referring now to FIGS. 1-2 and 5, the differential 10 may further comprise an actuator 36. Actuator 36 may be configured for engagement with the pinion housing 12. Actuator 36 may be generally ring-shaped in accordance with an embodiment of the invention. Actuator 36 may comprise an outer radial surface 38 that extends circumferentially around the actuator 36. Actuator 36 may further comprise a first face 40 and a second face 42. The second face 42 may oppose the first face 40. The actuator 36 may include a depression 44 located on the first face 40. The actuator 36 may include a single depression 44 on the first face 40 in an embodiment of the invention. The actuator 36 may include a plurality of depressions 44 on the first face 40 in accordance with some embodiments of the invention. The depression 44 may generally correspond in shape to the first projection 20 or the second projection 22 on the pinion housing 12. The first face 40 may be configured to face the pinion housing 12 in an embodiment of the invention.

At least one of the depressions 44 may comprise a plurality of surfaces in accordance with an embodiment of the invention. For example and without limitation, at least one of the surfaces may be substantially parallel to the first face 40, and at least one of the surfaces may be substantially angled relative to the first face 40. In accordance with an embodiment of the invention, at least one of the depressions 44 may comprise about three surfaces. Although a depression comprising three surfaces is mentioned in detail and generally illustrated, the depression 44 may comprise fewer or more surfaces in accordance with various embodiments of the invention. The second face 42 of the actuator 36 may be generally or substantially flat in accordance with an embodiment of the invention. For example and without limitation, the second face 42 of the actuator 36 may not have a depression. The outer radial surface 38 of the actuator 36 may comprise at least one and/or a plurality of radially extending tabs 46. For example and without limitation, the actuator 36 may include three tabs 46. Although three tabs 46 are mentioned in detail and generally illustrated, the actuator may have fewer or more tabs 46 in accordance with other embodiments of the invention. The tabs 46 may be equi-angularly spaced around the circumference and/or periphery of the actuator 36. Accordingly, the tabs 46 may be approximately 120° apart in accordance with an embodiment of the invention. Tabs 46 may be generally configured for engagement with the differential case 50. For example and without limitation, tabs 46 may be configured for engagement with slots in the differential case 50. FIG. 6 generally shows the actuator 36 disposed in differential case 50. In accordance with an embodiment of the invention, torque may be transferred from the differential case 50 to the actuator 36. The actuator 36 may be configured to drive the pinion housing 12. The actuator 36 may be configured to lock the pinions 24 with both side gears 32, pushing both friction plate assemblies 48 and transferring torque to both wheels of a motor vehicle (not shown) simultaneously.

Figure 7B:
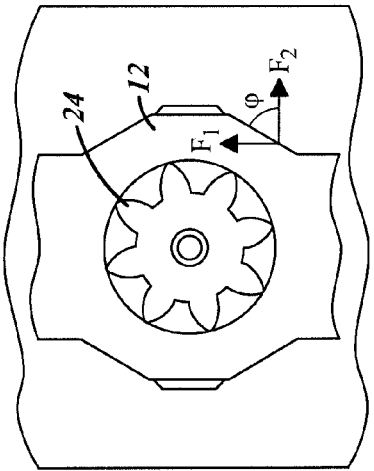
FIGS. 7A-7B are schematic views of force acting on the pinion housing of FIG. 2.
Figure 7A:
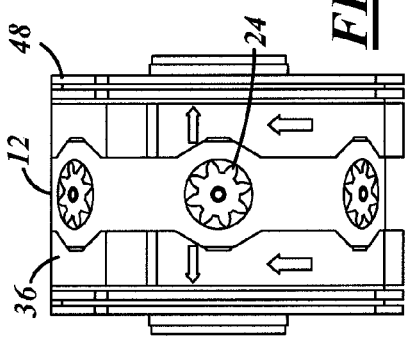

Referring to FIGS. 1-2, the differential 10 may further comprise friction plate assemblies 48 (e.g., a plurality of friction plates). The friction plate assemblies 48 may be disposed on both sides of the pinion housing 12. The friction plate assemblies 48 may be disposed between the actuator 36 and the differential case 50. At least one of the plurality of friction plates of the friction plate assembly 48 may include a coating. For example, at least one of the plurality of friction plates of the friction plate assembly 48 may include a coating configured to aid the friction plates to react to movement between the side gears 32 and the differential case 50. The axial force exerted by the actuator 36 may generally depend on the input torque and the ramp or wedge angle on the actuator 36. During turning of the motor vehicle at higher speeds on high coefficient surfaces, both of the wheels may have different resistive torque and rotational speed. As the torque capacity of the friction plate assemblies 48 is less than the torque available at both the side gears 32, differential action may make the friction plate assemblies 48 slip and allow the outer wheel to rotate faster than the inner wheel, for example. If one wheel slips as a result of a low friction surface beneath the wheel, the pinion housing 12 may be configured to generate an axial force against the actuator 36. Referring now to FIGS. 7A-7B, a schematic of the reaction force is generally illustrated. This may result in compression of the friction plate assemblies 48 against the side gears 32, thereby transferring torque from the differential case 50 to the side gear 32 through the friction plate assembly 48. In FIG. 7B, the axial force $F_a$ generated against the actuator 36 by the ramp or wedge 22 on pinion housing 12 may generally be in accordance with the following equation: $F_a = F/\tan \phi$, where F is the input force and $\phi$ is the ramp or wedge angle on the ramp or wedge 22 of the pinion housing 12.

Differential case 50, along with cover 52, may be provided to house the pinion housing 12, the pinions 24, the side gears 32 and/or any number of other components of the differential 10. The differential 10 may further include a ring gear (not shown). The ring gear may be connected to an input source and/or drive source (not shown) in a conventional manner for rotating the differential case 50. The differential 10 may further include thrust washers 54. Thrust washers 54 may be provided between a thrust face of the differential case 50 and a thrust face of the side gear 32 and between a thrust face of the cover 52 and a thrust face of the side gear 32. Thrust washers 54 may be provided to control backlash, as the friction pack assemblies 48 may become isolated from the axial thrust force of the side gears 32.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:
1. A differential, comprising:
a differential case;
a side gear comprising a helical face gear;
a helical pinion configured for meshing engagement with the side gear; and
a pinion housing comprising a hole in which the helical pinion is supported, wherein the pinion housing comprises:
a first face;
a second face opposing the first face;
a first projection located on the first face proximate the hole;

a second projection located on the second face proximate the hole; and a channel extending axially from the first face to the second face of the pinion housing only in an axial direction and at a location of the hole.

2. The differential of claim 1, wherein the first and second projections extend in the axial direction of the pinion housing.

3. The differential of claim 1, wherein the first projection comprises a ramp.

4. The differential of claim 1, wherein the second projection comprises a ramp.

5. The differential of claim 1, wherein the first projection comprises a plurality of surfaces.

6. The differential of claim 1, wherein the second projection comprises a plurality of surfaces.

7. The differential of claim 5, wherein at least one of the plurality of surfaces is substantially parallel to the first face.

8. The differential of claim 7, wherein at least one of the plurality of surfaces is substantially angled relative to the first face.

9. The differential of claim 1, wherein the hole of the pinion housing extends radially inwardly from an outer radial surface of the pinion housing.

10. The differential of claim 1, further comprising an actuator configured for engagement with the pinion housing.

11. The differential claim of 10, wherein the actuator comprises a first face that is configured to face the pinion housing and includes a depression.

12. The differential of claim 11, wherein the depression corresponds in shape to the first projection.

13. The differential of claim 11, wherein the depression comprises a plurality of surfaces, wherein at least one of the plurality of surfaces is substantially parallel to the first face, and wherein at least one of the plurality of surfaces is substantially angled relative to the first face.

14. The differential of claim 10, wherein the actuator comprises a radially extending tab configured for engagement with the differential case.

15. The differential of claim 10, further comprising a plurality of friction plates disposed between the actuator and the differential case.

16. The differential of claim 15, wherein at least one of the plurality of friction plates includes a coating.

17. A differential, comprising:
 a differential case;
 a side gear comprising a helical face gear;
 a helical pinion configured for meshing engagement with the side gear;
 a pinion housing comprising a hole in which the helical pinion is supported, wherein the pinion housing comprises:
  a first face;
  a second face opposing the first face;
  a first projection located on the first face proximate the hole;
  a second projection located on the second face proximate the hole
 a channel extending axially from the first face to the second face of the pinion housing only in an axial direction and at a location of the hole;
 an actuator configured for engagement with the pinion housing, wherein the actuator comprises a first face that includes a depression corresponding in shape to the first projection or the second projection; and
 a plurality of friction plates disposed between the actuator and the differential case.

18. The differential of claim 1, wherein the channel is substantially radially aligned with the hole.

19. The differential of claim 17, wherein the channel is substantially radially aligned with the hole.

* * * * *